United States Patent
Yoshimura et al.

(10) Patent No.: US 7,389,922 B2
(45) Date of Patent: Jun. 24, 2008

(54) SYSTEM AND METHOD FOR MANAGING MATERIALS

(75) Inventors: Yasushi Yoshimura, Tokyo (JP); Tetsuya Tsubokura, Tokyo (JP); Gou Yoshimura, Tokyo (JP); Shinichi Ebata, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 221 days.

(21) Appl. No.: 11/260,388

(22) Filed: Oct. 28, 2005

(65) Prior Publication Data

US 2006/0136698 A1 Jun. 22, 2006

(30) Foreign Application Priority Data

Dec. 22, 2004 (JP) ............................. 2004-371652

(51) Int. Cl.
*G06F 19/00* (2006.01)
(52) U.S. Cl. ...................... 235/385; 235/382; 235/439; 235/451
(58) Field of Classification Search ............... 340/10.4; 235/384, 375, 382, 383, 385, 439, 451, 492
See application file for complete search history.

(56) References Cited

U.S. PATENT DOCUMENTS

| 5,886,634 | A * | 3/1999 | Muhme | 340/572.1 |
| 5,959,568 | A * | 9/1999 | Woolley | 342/42 |
| 6,523,752 | B2 | 2/2003 | Nishitani et al. | |
| 6,940,392 | B2 * | 9/2005 | Chan et al. | 340/10.4 |
| 7,034,683 | B2 * | 4/2006 | Ghazarian | 340/568.1 |
| 7,159,654 | B2 * | 1/2007 | Ellison et al. | 166/250.01 |
| 2004/0232230 | A1 * | 11/2004 | Linton et al. | 235/385 |

FOREIGN PATENT DOCUMENTS

JP        2001-233410        8/2001

* cited by examiner

*Primary Examiner*—Seung H Lee
(74) *Attorney, Agent, or Firm*—Harness, Dickey & Pierce, P.L.C.

(57) ABSTRACT

The system for managing materials comprises: a material yard which has a material carry-in port and a material carry-out port, the material yard being divided into a plurality of yard sections which store materials; a plurality of first tags which record data of the materials to be read in a non-contact manner, the first tags being attached to the materials managed in the material yard; a second tag which stores and sends data of an identification ID issued for each of lots into which the materials are classified to check a current position of each of the lots via a position sensing signal transmitted to the material yard, the second tag being attached to each of the lots; a reading device which reads the data recorded in the first tags, the reading device being provided in at least one of the material carry-in port and the material carry-out port within the material yard; a plurality of receiving devices which receive a data signal of the identification ID transmitted from the second tag, the receiving devices being respectively provided in the yard sections; a plurality of transmitting devices which transmit the position sensing signal received from the second tag to check the current position of the second tag, the transmitting devices being provided on each of a plurality of predetermined positions in the material yard; and a database which records the data of the materials and management data for managing the materials so as to manage the materials.

7 Claims, 5 Drawing Sheets

SYSTEM AND METHOD FOR MANAGING MATERIALS

BACKGROUND OF THE INVENTION

1. Field of the Invention

The present invention relates to a system and a method for managing materials in a material yard on a construction site or the like.

2. Description of the Related Art

A material yard for temporarily storing materials used for the operations is provided in the vicinity of a construction or civil engineering operation site or the like. Generally, the material yard is divided into a plurality of yard sections, so that materials are classified in order to be stored according to operation steps and types of materials. However, such the material yard may extend for several hundred square meters depending on the site. In this case, conventionally, identification IDs for identifying the materials are manually checked when carrying in materials, and then the materials are classified to be stored according to those yard sections. In the case of stacking the materials, for example, non-target materials sometimes need to be located to another site when a target material is to be taken out. When shipping a target material, the material is retrieved by checking the identification ID at a database and a yard section where the material is located. However, this retrieval operation is required to visually find where a specific section is located and at which position within the section the material is located (because there is often no predetermined shelf or the like within the yard section). Therefore, in the case in which the material yard is vast, it is very difficult to find out the material rapidly.

Recently, in a method for managing such a carrying-in of article, a classification of article, a storage of article, and a carrying-out of article, the identification ID of article is read by means of a device with a non-contact tag such as a Radio Frequency Identification (RFID), thereby managing the carrying-in, the classification, the storage, the carrying-out, and the like. In addition to reading of data at the time of carrying-in and carrying-out using such a non-contact tag, a system is devised to be notified through blinking of a guide lamp where an article is to be stored or is stored when information is sent from a carried terminal (see Japanese Patent Application Publication No. 2001-233410, for example).

However, in the material yard on a construction site, civil engineering site, and the like, which is not clearly divided by shelves or the like, the stored articles vary from time to time, while positions where the articles are stored vary from time to time. In this case, in a system as described in Japanese Patent Application Publication No. 2001-233410, it is difficult to guide an operator by providing a fixed guide lamp. Furthermore, it may also be difficult to attach a non-contact tag to a material depending on type thereof.

SUMMARY OF THE INVENTION

The present invention has been contrived in view of such circumstances, and an object thereof is to provide a system and a method for managing materials that can manage materials more efficiently.

In order to attain the aforementioned object, the present invention is directed to a system for managing materials comprising: a material yard which has a material carry-in port and a material carry-out port, the material yard being divided into a plurality of yard sections which store materials; a plurality of first tags which record data of the materials to be read in a non-contact manner, the first tags being attached to the materials managed in the material yard; a second tag which stores and sends data of an identification ID issued for each of lots into which the materials are classified to check a current position of each of the lots via a position sensing signal transmitted to the material yard, the second tag being attached to each of the lots; a reading device which reads the data recorded in the first tags, the reading device being provided in at least one of the material carry-in port and the material carry-out port within the material yard; a plurality of receiving devices which receive a data signal of the identification ID transmitted from the second tag, the receiving devices being respectively provided in the yard sections; a plurality of transmitting devices which transmit the position sensing signal received from the second tag to check the current position of the second tag, the transmitting devices being provided on each of a plurality of predetermined positions in the material yard; and a database which records the data of the materials and management data for managing the materials so as to manage the materials.

According to the present invention, data relating to materials, and data relating to a position where each of the materials classified into lots is located in a yard section can be easily taken into the database. Therefore, it is possible to manage materials more efficiently.

The present invention is also directed to the system for managing materials wherein each of the first tags is an RFID.

According to the present invention, data relating to each material can be easily read in a non-contact manner from a tag attached to the material, so as to be taken into the database. Therefore, it is possible to manage materials more efficiently.

The present invention is also directed to the system for managing materials wherein the second tag is set removability to the materials which are grouped as each of the lots.

According to the present invention, the second tag can be removed for carrying. In addition, it is also possible to cause an operator carrying the second tag with data of a site to guide where materials are located in a direction of a target material with respect to the current position of the second tag. Therefore, it is possible to manage materials more efficiently.

The present invention is also directed to the system for managing materials wherein if the materials are piping materials, the first tags are provided on piping protective caps which cover both ends of the piping materials.

According to the present invention, in the case of temporary material location, even if the piping materials are stacked, end faces thereof are exposed, and thus the first tags provided on the protective caps attached to the end faces are not hidden by stacking of the piping materials. In addition, since the first tags are embedded inside or in the protective caps, it is possible to prevent the first tags from being damaged by excessive contact with another material or the like. Furthermore, in the case in which the piping materials are temporarily suspended, since data in the first tags of the protective caps at ends close to each other of the piping materials are read simultaneously, it is possible to determine whether or not the piping materials can be connected, using data relating to materials in an architectural drawing. Moreover, since material data which is recorded on the first tags of the protective caps removed from the piping materials is read, it is possible to specify the piping material that the tacking operation is finished, thereby figuring out the trading volume more efficiently. Therefore, it is possible to manage materials more efficiently.

In order to attain the aforementioned object, the present invention is directed to a method for managing materials which manages the materials carried into a material yard divided into a plurality of yard sections, the method comprising: a first step of reading data of the materials by a reading device to record the data in a database, and designating storage sites from the yard sections according to management data which is managed in the database, the storage sites storing the materials in the yard sections, the data being recorded in a plurality of first tags attached to the materials; a second step of classifying the materials carried in the material yard into lots according to the yard sections designated for the materials, issuing an identification ID for each of the lots according to the database, and attaching a second tag to each of the lots, the second tag storing and sending data of an identification ID to check a current position of each of the lots via a position sensing signal transmitted to the material yard; a third step of specifying that the lots are respectively carried into the designated yard sections by receiving a signal of the identification ID transmitted from the second tag with a receiving device provided for each of the yard sections; a fourth step of unloading the lots respectively to arbitrary sites in which the lots are located in the corresponding yard sections; a fifth step of receiving with the second tag the position sensing signal transmitted from a transmitting device which are arranged at each of a plurality of predetermined positions in the material yard, and checking the storage sites in the designated yard sections in which the lots are unloaded by determining the current position of the second tag attached to each of the lots unloaded in the fourth step; and a sixth step of recording the data obtained in the first to fifth steps into the in the database.

According to the present invention, data relating to materials, data relating to lots into which the materials are classified, and data relating to storage sites where the lots are stored can be recorded in a database in association with each other so as to manage each data. Therefore, it is possible to manage materials more efficiently.

Furthermore, in relative to a located lot, the position of the lot can be recorded automatically by attaching the second tag to the lot during location.

In order to attain the aforementioned object, the present invention is directed to a method for managing materials which manages the materials carried out from a material yard divided into a plurality of yard sections via a material carry-out port in the material yard, the method comprising: a first step of extracting data of each of the materials to be carried out and the identification ID of each of the lots corresponding to the materials to be carried out according to the data of the materials recorded in the database, and displaying data of the yard sections where the lots corresponding to the materials to be carried out are stored and positions where the lots corresponding to the materials to be carried out are stored; a second step of moving to the storage sites where the lots corresponding to the materials to be carried out are stored according to the data displayed in the first step; a third step of selecting the materials to be carried out from the lots corresponding to the materials to be carried out, and carrying out the selected materials from the storage sites; and a fourth step of reading data recorded in the first tags attached to the materials which are carried out in the third step with a reading device at the material carry-out port to check the materials carried out from the material yard, and recording the read data of the materials carried out into the database.

According to the present invention, even when the state in a material yard is not known, it is possible to carry out materials without fail. In addition, it is possible to easily record and manage data relating to materials which are carried out, in a database. Therefore, it is possible to manage materials more efficiently.

In order to attain the aforementioned object, the present invention is directed to a method for managing materials which manages the materials carried into and out from a material yard divided into a plurality of yard sections via a material carry-in port and a material carry-out port in the material yard, the method comprising: a first step of reading data of the materials by a reading device to record the data in a database, and designating storage sites from the yard sections according to management data which is managed in the database, the storage sites storing the materials in the yard sections, the data being recorded in a plurality of first tags attached to the materials; a second step of classifying the materials carried in the material yard into lots according to the yard sections designated for the materials, issuing an identification ID for each of the lots according to the database, and attaching a second tag to each of the lots, the second tag storing and sending data of an identification ID to check a current position of each of the lots via a position sensing signal transmitted to the material yard; a third step of specifying that the lots are respectively carried into the designated yard sections by receiving a signal of the identification ID transmitted from the second tag with a receiving device provided for each of the yard sections; a fourth step of unloading the lots respectively to arbitrary sites in which the lots are located in the corresponding yard sections; a fifth step of receiving with the second tag the position sensing signal transmitted from a transmitting device which are arranged at each of a plurality of predetermined positions in the material yard, and checking the storage sites in the designated yard sections in which the lots are unloaded by determining the current position of the second tag attached to each of the lots unloaded in the fourth step; a sixth step of recording the data obtained in the first to fifth steps into the in the database; a seventh step of extracting data of each of the materials to be carried out and the identification ID of each of the lots corresponding to the materials to be carried out according to the data of the materials recorded in the database, and displaying data of the yard sections where the lots corresponding to the materials to be carried out are stored and positions where the lots corresponding to the materials to be carried out are stored; an eighth step of moving to the storage sites where the lots corresponding to the materials to be carried out are stored according to the data displayed in the seventh step; a ninth step of selecting the materials to be carried out from the lots corresponding to the materials to be carried out, and carrying out the selected materials from the storage sites; and a tenth step of reading data recorded in the first tags attached to the materials which are carried out in the third step with the reading device at the material carry-out port to check the materials carried out from the material yard, and recording the read data of the materials carried out into the database.

As described above, according to the present invention, while data relating to a material such as carrying-in, carrying-out, and a storage site can be taken easily into a database, it is easily possible to check where the materials are located. Therefore, it is possible to manage materials more efficiently.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 5 is a flowchart showing a sequence of management when a material is carried in.

DETAILED DESCRIPTION OF THE PREFERRED EMBODIMENTS

Figure 1A:
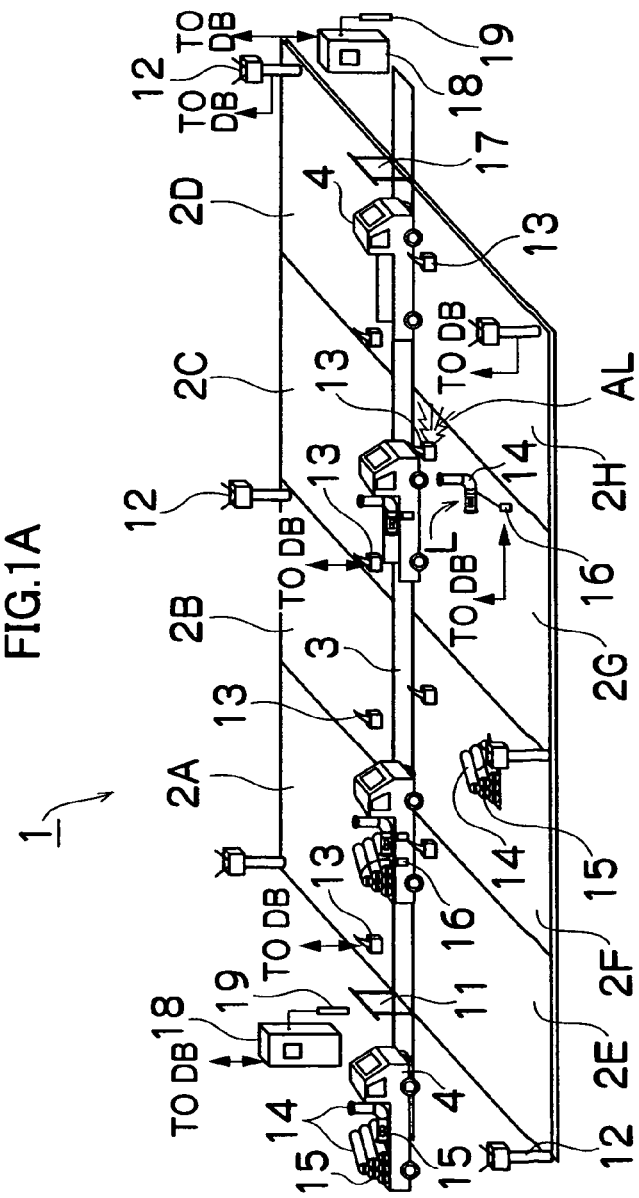
FIGS. 1A and 1B are drawings of a material management system according to an embodiment of the present invention, FIG. 1A showing an overall view, and FIG. 1B showing an overall block diagram.

A preferred embodiment of a system and a method for managing materials according to the present invention will be explained below in detail with reference to the accompanying drawings. In this embodiment, management of materials used for construction and civil engineering operations is taken as an example. Note that the same reference numerals or reference characters in the drawings designate the same members.

Figure 1B:
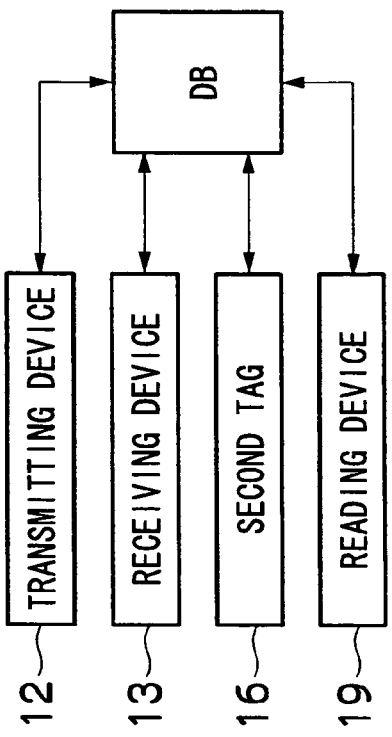
Figure 2:
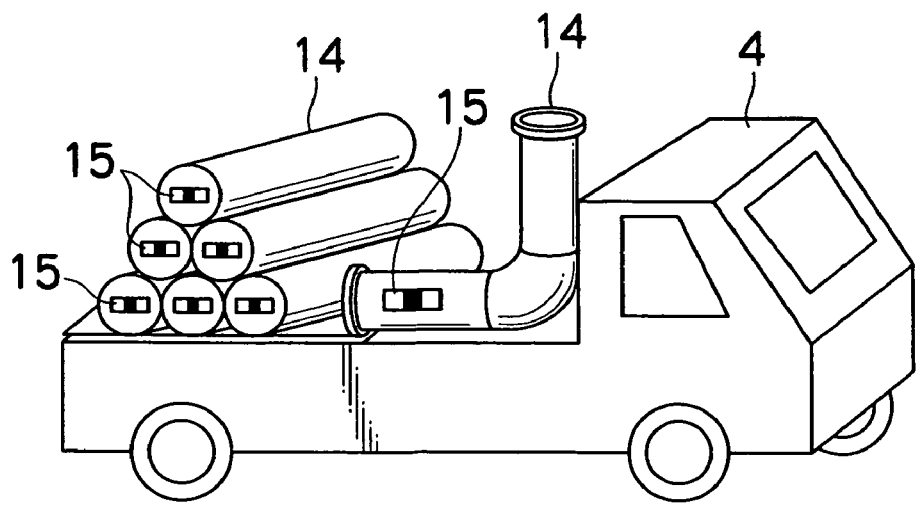
FIG. 2 is a diagram showing a state of transporting materials.
Figure 3:
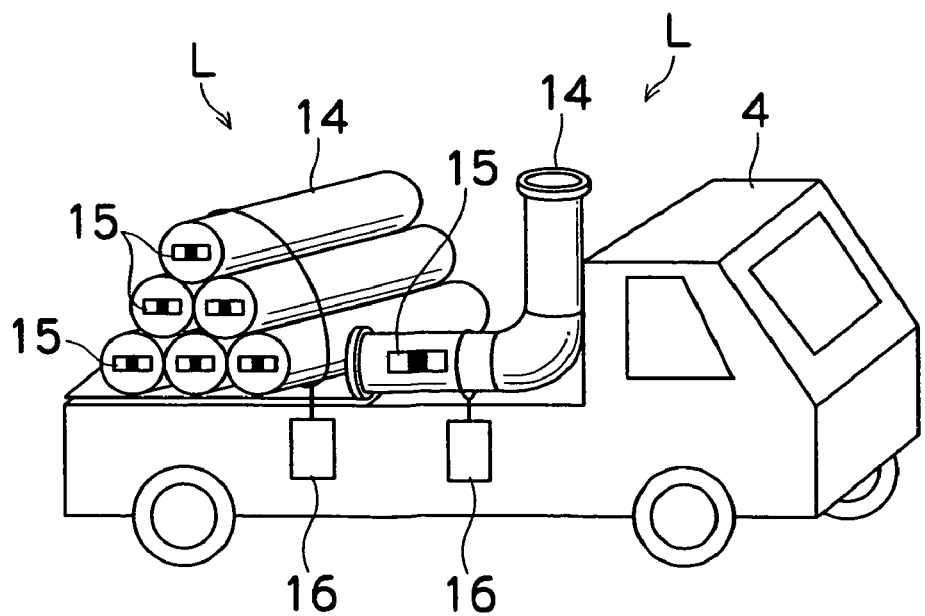
FIG. 3 is a diagram showing a state of transporting materials attached second tags.
Figure 4:
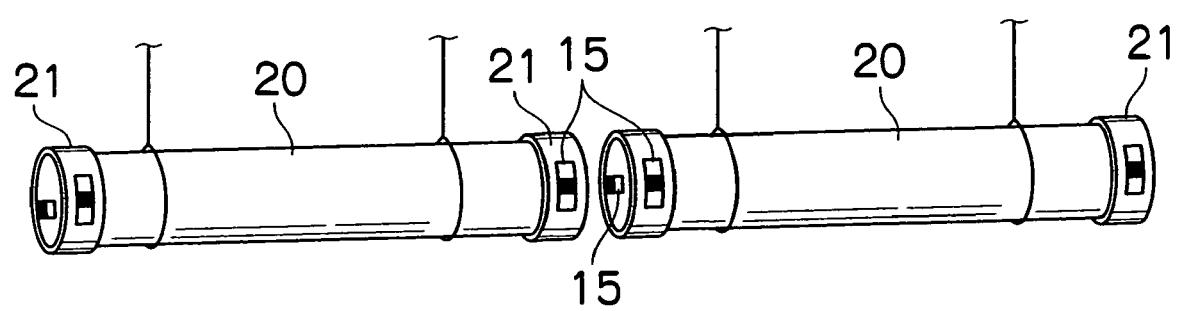
FIG. 4 is a diagram showing a state in which first tags are attached to piping materials serving as an example of the materials according to the present invention.

FIGS. 1A and 1B are drawings of a material management system according to an embodiment of the present invention, FIG. 1A showing an overall view, and FIG. 1B showing an overall block diagram. FIG. 2 is a diagram showing a state of transporting materials. FIG. 3 is a diagram showing a state of transporting materials attached second tags. FIG. 4 is a diagram showing a state in which first tags are attached to piping materials serving as examples of materials according to the present invention.

As shown in FIG. 2, a first tag 15 is attached in advance to each of materials 14 having various shapes which are moved by a transport machine 4 (e.g., a truck). Data relating to the material such as the model of the material is recorded on each of first tags 15. For example, an RFID (Radio Frequency Identification) tag can be preferably used as the first tag 15.

As shown in FIGS. 1A and 1B, a plurality of yard sections 2A to 2H are provided in a material yard 1. A road 3 is faced to each of the yard sections 2A to 2H, so that materials can be carried in or carried out from/into the road 3.

A material carry-in port 11 through which the transport machine 4 enters the material yard 1, and a material carry-out port 17 through which the transport machine 4 exits the material yard 1, are respectively provided at both ends of the road 3.

Installation sites 18 are provided in the vicinity of the material carry-in port 11 and the material carry-out port 17, respectively. An input device (not shown) and a reading device 19 are disposed in each of the installation sites 18.

In each reading device 19, data of the first tag 15 attached to each material 14 is read, and sends the read data to an electronic computing device (database) DB which is provided in the vicinity of the material yard 1 or in anywhere within the material yard 1. When the data is sent, designation is performed by the database DB whether yard sections 2A to 2H are to be a storage site for each material 14, according to the material management data.

Each of the input devices is used to input necessary data to the database DB when carrying in and out the materials 14 or required.

In the materials 14 that a yard section for storage is designated, the materials 14 that the designated yard sections are one and the same, and the materials 14 that the types or the storages sites of the yard section are one and the same or similar to each other are grouped together as a lot L, as shown in FIG. 3. Data relating to each lot L which each of the materials 14 is grouped is recorded in the database DB. A separate identification ID is issued for each lot L from the database DB, and the issued identification ID is separately recorded in a second tag 16.

Each of the second tags 16 having an identification ID recorded therein is removably attached to one of the lots L corresponding to each of the recorded identification IDs. In this state, the second tag 16 can send the recorded identification ID to the outside.

Receiving devices 13 are provided at the entrances to the yard sections 2A to 2H, respectively. In the receiving devices 13, it is possible to receive identification IDs which are sent from the second tags 16, to emit an announcement signal to a specific identification ID in the received identification IDs, and to send the received identification IDs to the database DB.

For example, as shown in FIGS. 1A and 1B, when the lot L transported by the transport machine 4 includes the materials 14 designated to be located in the yard section 20, the receiving device 13 provided in the yard section 2G notifies the approaching transport machine 4 that the designated yard section is here via an announcement signal AL such as turning on of a light or voice. When the lot L is carried into the yard section 20, the identification ID received by the receiving device 13 in the yard section 2G is sent to the database DB. With this operation, it is checked that the lot with the identification ID is carried into the designated yard section.

A plurality of transmitting devices 12 are further provided in the periphery of the material yard 1. A current position in the material yard 1 can be checked by each second tag 16 using signals transmitted from some of the transmitting devices 12, and the current positional data can be also send to the database DB.

In this case, as shown in FIGS. 1A and 1B, when the lot L with the attached second tag 16 is stored in the yard section 20, it is checked by the second tag 16 at which position within the yard section 2G the storage site for the lot L is located, and the position-related data is sent to and recorded in the database DB.

Furthermore, when carrying out the material 14, the current position within the material yard 1 can be checked using the second tag 16 by carrying one of the second tags 16 which are recorded data relating to the position at which the lot L including one of the materials 14 required to be carried out is located in the material yard 1. Therefore, it is possible to guide the transport machine 4 to the storage site for the lot L including the material 14.

With those arrangements, in the material management system according to the present invention, it is possible to take data relating to the materials 14 into the database DB easily, and to manage the data, thereby also guiding the transport machine 4 to a storage site. Therefore, it is possible to manage more efficiently.

Incidentally, the reading operation relating to each first tag 15 is performed by a person on standby in one of the installation sites 18 using the corresponding small reading device 19, or an operator transporting the corresponding material 14 by the transport machine 4. Alternatively, the reading operation may be also performed by passing through the reading device 19 formed in the shape of a gate.

In the case in which each of the materials 14 is a piping material, as shown in FIG. 4, a protective cap 21 made of resin is attached to each end of a piping material 20, and then the first tag 15 is provided on the protective cap 21. With this arrangement, even if each piping material 20 is made of metal, the first tags 15 using RFID tags have little effect on metal of the piping material 20 because the first tags 15 are separated from the metal surface of the piping material 20.

Furthermore, when data relating to each of the materials recorded on two facing ones of the first tags 15 are read at once in the state in which the piping materials 20 are temporarily suspended as shown in FIG. 4, it is possible to determine whether or not the piping materials 20 may be connected, by comparing the data relating to the piping materials 20 with material data in an architectural drawing.

Figure 5:
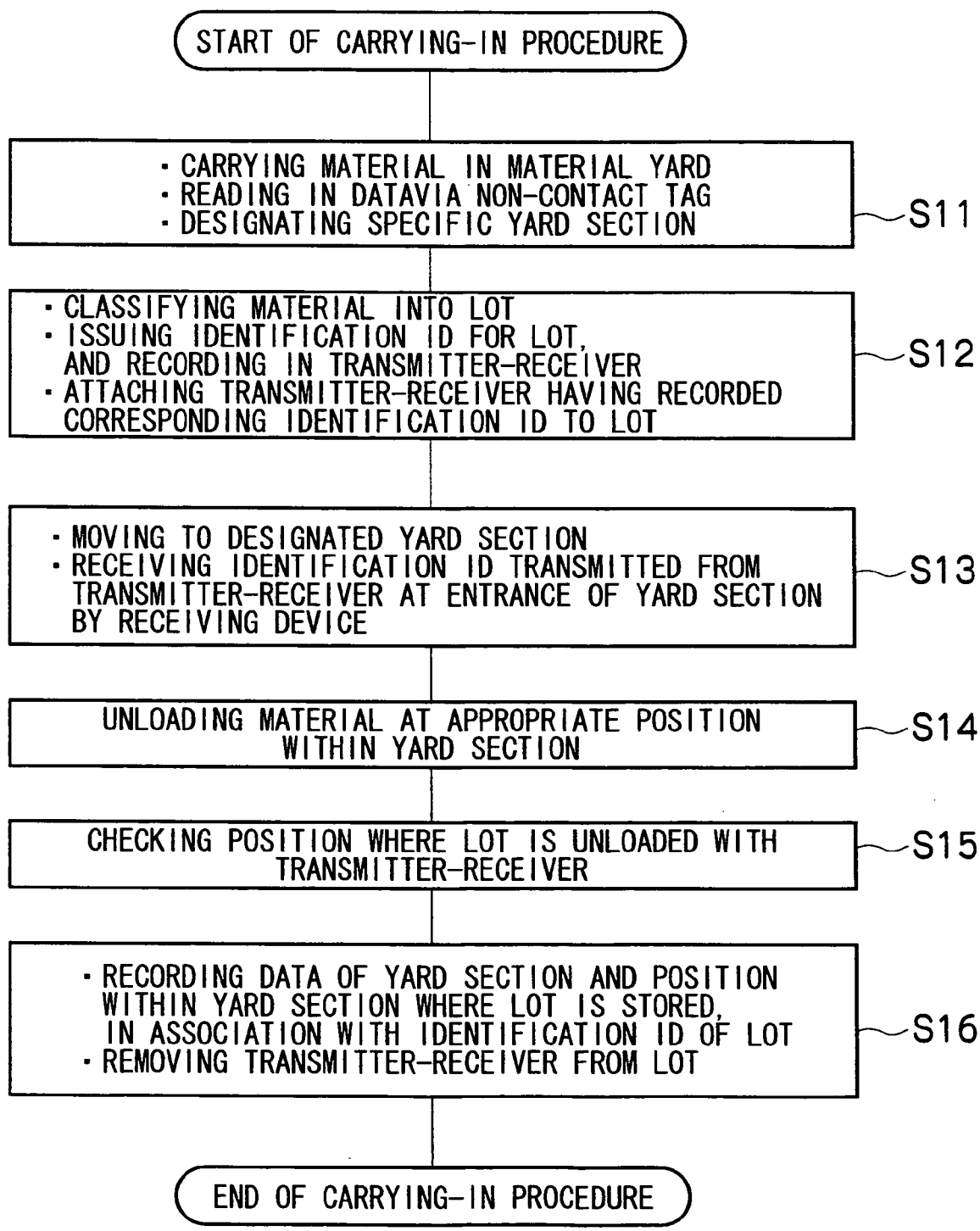
Figure 6:
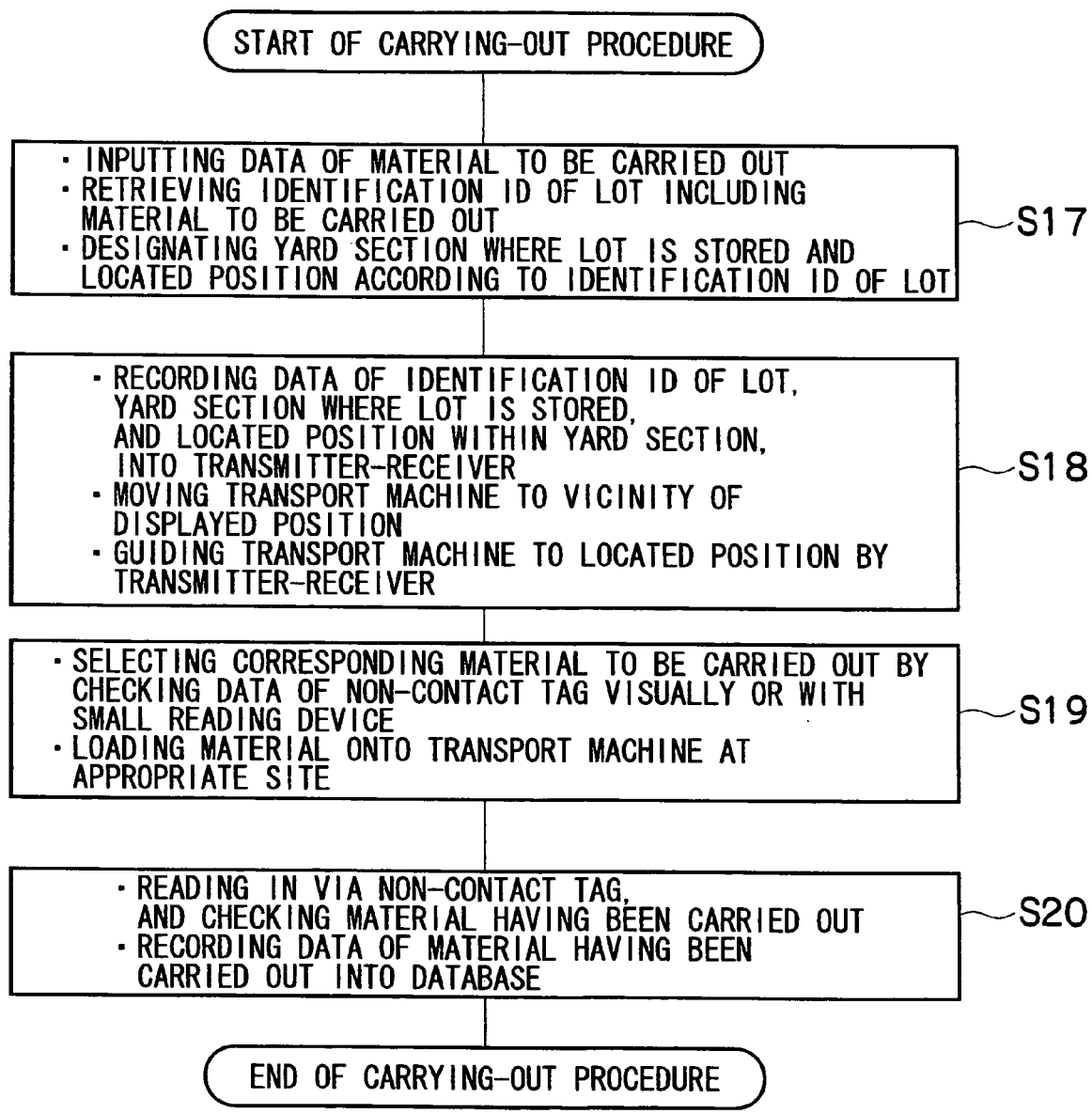
FIG. 6 is a flowchart showing a sequence of management when a material is carried out.

Next, in a method for managing materials according to the embodiment of the present invention, management flows when the materials are carried in and out will be described. FIG. 5 is a flowchart showing a sequence of management when a material is carried in. FIG. 6 is a flowchart showing a sequence of management when a material is carried out.

A management flow in a case of carrying the materials 14 in the material yard 1 to store temporarily will be described first.

First, as shown in FIG. 5, when the materials 14 loaded on the transport machine 4 is carried to the material carry-in port 11 shown in FIGS. 1A and 1B, a carrying-in procedure starts. At the material carry-in port 11, data relating to each of materials 14 (such as the model, name, size, shape, and the like) recorded on the first tags 15 attached to the materials 14 is read by the corresponding reading device 19, and is recorded in the database DB. After reading the data relating to the materials 14, a yard section to be stored is designated for each material 14 from the yard sections 2A to 2H according to management data which is managed in the database DB including a construction step, the use status of the yard sections, the type of the material, and the like (first step S11).

Next, of the materials 14 each for which a yard section for storage is determined, the materials 14 that the designated yard sections are one and the same, and the materials 14 that the types or the storages sites of the yard section are one and the same or similar to each other are grouped together as one of the lots L. After grouping the materials 14 into the lots L, the identification ID is issued for each of the lots L from the database DB, and then the issued identification ID is separately recorded in a second tag 16. The issued identification ID is separately recorded on the corresponding second tag 16, and each second tag 16 is removably attached to the lot L with the corresponding identification ID. When the second tags 16 are attached to all of the lots L, the transport machine 4 enters the material yard 1 (second step S12).

Next, when the transport machine 4 enters the material yard 1 and approaches a yard section designated for any of the lots L, the corresponding receiving device 13 emits the announcement signal AL so as to guide the transport machine 4. When the transport machine 4 passes through the entrance to the designated yard section, the receiving device 13 receives the identification IDs transmitted from the second tags 16 attached to the respective lots L. The received identification IDs are sent to the database DB, so as to check whether or not the lot L with the designated identification ID has correctly entered the designated yard section (third step S13).

Next, the transport machine 4 having entered in the yard section unloads the lot L including the materials 14 to be stored in the yard section to an appropriate site in the yard section (fourth step S14).

Next, a current position is checked with the second tag 16 attached to the unloaded lot L by receiving a signal from the transmitting devices 12, and then data of the checked current position is send to the database DB as data of the storage site for the unloaded lot L (fifth step S15).

Next, the data of the storage site and the identification ID of the lot L are recorded in the database DB in association with each other. After the recording, the second tag 16 attached to the lot L is removed and collected (sixth step S16).

Then, after the above-described steps, the carrying-in procedure is finished. The transport machine 4 having unloaded the materials 14 exits the material yard 1 through the material carry-out port 17.

In the present embodiment described above, the data of the storage site for the lot L is sent from the second tag 16 to the database DB in the fifth step S15, but the present invention is not limited to those. The data of the storage site may be temporarily recorded in the second tag 16 in the fifth step S15. Then, after the recorded second tag 16 may be collected in the sixth step S16, and then the data may be sent from another site to the database DB so that the data and the identification ID of the lot L are recorded in association with each other.

Next, a management flow in a case of carrying out necessary materials from the material yard 1 will be described.

First, as shown in FIG. 6, the transport machine 4 loaded with no materials stops at the material carry-in port 11 shown in FIGS. 1A and 1B. Next, at the material carry-in port 11, data relating to each material 14 to be carried out (such as a model, name, size, shape, and the like) are inputted from the input device (not shown) in the corresponding installation site 18. Next, the materials 14 to be carried out are extracted according to the input data, and then the identification ID of one of the lots L including the materials 14 to be carried out is retrieved. Then, data of the yard section position and the position in which the lot L with the identification ID is stored is displayed according to the retrieved identification ID (seventh step S17).

Next, the identification ID of the lot L including the materials 14 to be carried out, and the displayed data of the storage site are recorded in the corresponding second tag 16. Next, an operator who moves the transport machine 4 carries the second tag 16 with the recorded data, and enters the material yard 1. When the transport machine 4 enters the material yard 1 so as to approach one of the yard sections storing the lot L including the materials 14 to be carried out, the announcement signal AL is emitted from the receiving device 13 provided in the yard section so as to guide the transport machine 4. Then, when the transport machine 4 enters the yard section storing the lot L including the materials 14 to be carried out, the current position checked using the second tag 16 by receiving a signal from the transmitting devices 12 so as to guide the operator moving the transport machine 4 to the site where the lot L is stored (eighth step S18).

If the lot L including the materials 14 to be carried out is found, then the model of the materials is visually checked, or data of the corresponding first tags 15 are checked by a small reading device (not shown), so that the materials 14 are selected. The selected materials 14 are moved to an appropriate site so as to be loaded onto the transport machine 4. The transport machine 4 moves to the material carry-out port 17 (ninth step S19).

Then, when the transport machine 4 comes to the material carry-out port 17, data relating to the materials 14 recorded in the first tags 15 of the carried-out materials 14 is read by the reading device 19 provided in the installation site 18 in the vicinity of the material carry-out port 17. With this operation, it is performed to check whether or not the data of the materials 14 to be carried out input at the material carry-in port 11 correspond to the carried-out materials 14. If the data correspond to the materials 14, data of information in which the materials 14 have been carried out is recorded in the database DB (tenth step S20).

After the above-described steps, the carrying-out procedure is finished. Then, the transport machine 4 loaded with the materials 14 exits the material yard 1 through the material carry-out port 17.

In the first step S11 of the present embodiment, data is inputted from the input device (not shown) in the installation site 18, but the present invention is not limited to those. It is possible to adopt a method that data on a recording medium which has been inputted at another site is loaded into the database DB. In addition, it is also possible to adopt a method that data from a remote input device is inputted in advance to the database DB, using a telecommunication device, or the like.

With those management flows, in the method for managing materials according to the present invention, it is possible to take easily data relating to the materials 14 into the database DB, and to manage the data in association with data of carrying-in, carrying-out, storage sites, and the like. Therefore, it is possible to manage materials more efficiently.

As described above, according to the present invention, data relating to materials (such as carrying-in and carrying-out, located positions, and the like) can be taken into a database easily, and the positions of the materials can be easily checked. Therefore, it is possible to manage materials more efficiently.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A system for managing materials, comprising:
a material yard which has a material carry-in port and a material carry-out port, the material yard being divided into a plurality of yard sections which store materials;
a plurality of first tags which record data of the materials to be read in a non-contact manner, the first tags being attached to the materials managed in the material yard;
a second tag which stores and sends data of an identification ID issued for each of lots into which the materials are classified to check a current position of each of the lots via a position sensing signal transmitted to the material yard, the second tag being attached to each of the lots;
a reading device which reads the data recorded in the first tags, the reading device being provided in at least one of the material carry-in port and the material carry-out port within the material yard;
a plurality of receiving devices which receive a data signal of the identification ID transmitted from the second tag, the receiving devices being respectively provided in the yard sections;
a plurality of transmitting devices which transmit the position sensing signal received from the second tag to check the current position of the second tag, the transmitting devices being provided on each of a plurality of predetermined positions in the material yard; and
a database which records the data of the materials and management data for managing the materials so as to manage the materials.

2. The system for managing materials as defined in claim 1, wherein each of the first tags is an RFID.

3. The system for managing materials as defined in claim 1, wherein the second tag is set removability to the materials which are grouped as each of the lots.

4. The system for managing materials as defined in claim 1, wherein the materials are piping materials and, the first tags are provided on piping protective caps which cover both ends of the piping materials.

5. A method for managing materials which manages the materials carried into a material yard divided into a plurality of yard sections, the method comprising:
a first step of reading data of the materials by a reading device to record the data in a database, and designating storage sites from the yard sections according to management data which is managed in the database, the storage sites storing the materials in the yard sections, the data being recorded in a plurality of first tags attached to the materials;
a second step of classifying the materials carried in the material yard into lots according to the yard sections designated for the materials, issuing an identification ID for each of the lots according to the database, and attaching a second tag to each of the lots, the second tag storing and sending data of an identification ID to check a current position of each of the lots via a position sensing signal transmitted to the material yard;
a third step of specifying that the lots are respectively carried into the designated yard sections by receiving a signal of the identification ID transmitted from the second tag with a receiving device provided for each of the yard sections;
a fourth step of unloading the lots respectively to arbitrary sites in which the lots are located in the corresponding yard sections;
a fifth step of receiving with the second tag the position sensing signal transmitted from a transmitting device which are arranged at each of a plurality of predetermined positions in the material yard, and checking the storage sites in the designated yard sections in which the lots are unloaded by determining the current position of the second tag attached to each of the lots unloaded in the fourth step; and
a sixth step of recording the data obtained in the first to fifth steps into the in the database.

6. A method for managing materials which manages the materials carried out from a material yard divided into a plurality of yard sections via a material carry-out port in the material yard, the method comprising:
a first step of extracting data of each of the materials to be carried out and the identification ID of each of the lots corresponding to the materials to be carried out according to the data of the materials recorded in the database, and displaying data of the yard sections where the lots corresponding to the materials to be carried out are stored and positions where the lots corresponding to the materials to be carried out are stored;
a second step of moving to the storage sites where the lots corresponding to the materials to be carried out are stored according to the data displayed in the first step;
a third step of selecting the materials to be carried out from the lots corresponding to the materials to be carried out, and carrying out the selected materials from the storage sites; and
a fourth step of reading data recorded in the first tags attached to the materials which are carried out in the third step with a reading device at the material carry-out port to check the materials carried out from the material yard, and recording the read data of the materials carried out into the database.

7. A method for managing materials which manages the materials carried into and out from a material yard divided into a plurality of yard sections via a material carry-in port and a material carry-out port in the material yard the method comprising:

a first step of reading data of the materials by a reading device to record the data in a database, and designating storage sites from the yard sections according to management data which is managed in the database, the storage sites storing the materials in the yard sections, the data being recorded in a plurality of first tags attached to the materials;

a second step of classifying the materials carried in the material yard into lots according to the yard sections designated for the materials, issuing an identification ID for each of the lots according to the database, and attaching a second tag to each of the lots, the second tag storing and sending data of an identification ID to check a current position of each of the lots via a position sensing signal transmitted to the material yard;

a third step of specifying that the lots are respectively carried into the designated yard sections by receiving a signal of the identification ID transmitted from the second tag with a receiving device provided for each of the yard sections;

a fourth step of unloading the lots respectively to arbitrary sites in which the lots are located in the corresponding yard sections;

a fifth step of receiving with the second tag the position sensing signal transmitted from a transmitting device which are arranged at each of a plurality of predetermined positions in the material yard, and checking the storage sites in the designated yard sections in which the lots are unloaded by determining the current position of the second tag attached to each of the lots unloaded in the fourth step;

a sixth step of recording the data obtained in the first to fifth steps into the in the database;

a seventh step of extracting data of each of the materials to be carried out and the identification ID of each of the lots corresponding to the materials to be carried out according to the data of the materials recorded in the database, and displaying data of the yard sections where the lots corresponding to the materials to be carried out are stored and positions where the lots corresponding to the materials to be carried out are stored;

an eighth step of moving to the storage sites where the lots corresponding to the materials to be carried out are stored according to the data displayed in the seventh step;

a ninth step of selecting the materials to be carried out from the lots corresponding to the materials to be carried out, and carrying out the selected materials from the storage sites; and a tenth step of reading data recorded in the first tags attached to the materials which are carried out in the third step with the reading device at the material carry-out port to check the materials carried out from the material yard, and recording the read data of the materials carried out into the database.

* * * * *